(12) United States Patent
  Chai et al.

(10) Patent No.: US 12,683,251 B2
(45) Date of Patent: Jul. 14, 2026

(54) BATTERY CELL, BATTERY, POWER CONSUMPTION DEVICE, AND BATTERY CELL MANUFACTURING METHOD AND DEVICE

(71) Applicant: JIANGSU CONTEMPORARY AMPEREX TECHNOLOGY LIMITED, Liyang City (CN)

(72) Inventors: Zhisheng Chai, Liyang City (CN); Kun Fang, Liyang City (CN); Linlin Zhu, Liyang City (CN); Zhijun Guo, Liyang City (CN); Qingkui Chi, Liyang City (CN)

(73) Assignee: JIANGSU CONTEMPORARY AMPEREX TECHNOLOGY LIMITED, Liyang City (CN)

( * ) Notice: Subject to any disclaimer, the term of this patent is extended or adjusted under 35 U.S.C. 154(b) by 690 days.

(21) Appl. No.: 17/554,466

(22) Filed: Dec. 17, 2021

(65) Prior Publication Data

US 2023/0012207 A1    Jan. 12, 2023

Related U.S. Application Data

(63) Continuation of application No. PCT/CN2021/104779, filed on Jul. 6, 2021.

(51) Int. Cl.
   *H01M 50/536*      (2021.01)
   *H01M 10/04*       (2006.01)
   (Continued)

(52) U.S. Cl.
   CPC ..... *H01M 50/536* (2021.01); *H01M 10/0404* (2013.01); *H01M 10/0525* (2013.01);
   (Continued)

(58) Field of Classification Search
   None
   See application file for complete search history.

(56) References Cited

U.S. PATENT DOCUMENTS 6,117,589 A * 9/2000 Satou .................. H01M 50/531
                                                   429/211
8,623,545 B2    1/2014 Kim et al.
          (Continued)

FOREIGN PATENT DOCUMENTS

CN         1694281 A    11/2005
CN       101005127 A     7/2007
          (Continued)

OTHER PUBLICATIONS

Machine English translation of CN110379943A originally published to Xing Oct. 25, 2019 (Year: 2019).*
          (Continued)

*Primary Examiner* — Ula C Ruddock
*Assistant Examiner* — Mary Grace Harris
(74) *Attorney, Agent, or Firm* — Scully, Scott, Murphy & Presser, P.C.

(57) ABSTRACT

The embodiments of this application provide a battery cell, a battery, a power consumption device, and a battery cell manufacturing method and device, which pertain to the technical field of batteries. The battery cell includes a housing, an electrode assembly, an end cover, and a current collecting member. The housing has an opening. The electrode assembly is accommodated in the housing. The end cover covers the opening and is connected to the housing in a sealed manner. The current collecting member is accommodated in the housing and is located on a side of the electrode assembly facing the end cover, and the current collecting member is configured to be connected to the
          (Continued)

housing and the electrode assembly, so that the electrode assembly is electrically connected to the housing.

19 Claims, 9 Drawing Sheets

(51) Int. Cl.

| | | |
|---|---|---|
| *H01M 10/0525* | (2010.01) | |
| *H01M 10/0587* | (2010.01) | |
| *H01M 50/107* | (2021.01) | |
| *H01M 50/152* | (2021.01) | |
| *H01M 50/184* | (2021.01) | |
| *H01M 50/188* | (2021.01) | |
| *H01M 50/213* | (2021.01) | |
| *H01M 50/247* | (2021.01) | |
| *H01M 50/249* | (2021.01) | |
| *H01M 50/317* | (2021.01) | |
| *H01M 50/342* | (2021.01) | |
| *H01M 50/528* | (2021.01) | |
| *H01M 50/531* | (2021.01) | |
| *H01M 50/538* | (2021.01) | |
| *H01M 50/559* | (2021.01) | |
| *H01M 50/586* | (2021.01) | |
| *H01M 50/308* | (2021.01) | |

(52) U.S. Cl.

CPC ..... *H01M 10/0587* (2013.01); *H01M 50/107* (2021.01); *H01M 50/152* (2021.01); *H01M 50/184* (2021.01); *H01M 50/188* (2021.01); *H01M 50/213* (2021.01); *H01M 50/247* (2021.01); *H01M 50/249* (2021.01); *H01M 50/317* (2021.01); *H01M 50/3425* (2021.01); *H01M 50/528* (2021.01); *H01M 50/531* (2021.01); *H01M 50/538* (2021.01); *H01M 50/559* (2021.01); *H01M 50/586* (2021.01); *H01M 50/308* (2021.01); *H01M 2220/20* (2013.01); *H01M 2220/30* (2013.01); *Y02E 60/10* (2013.01); *Y02P 70/50* (2015.11)

(56) References Cited

U.S. PATENT DOCUMENTS

| | | | | |
|---|---|---|---|---|
| 9,490,079 | B2 | 11/2016 | So et al. | |
| 9,564,626 | B2 | 2/2017 | Kim | |
| 10,256,455 | B2 | 4/2019 | Yoo et al. | |
| 2001/0007729 | A1* | 7/2001 | Kitoh | H01M 10/0525 |
| | | | | 429/94 |
| 2005/0048365 | A1 | 3/2005 | Miyahisa et al. | |
| 2005/0238951 | A1 | 10/2005 | Yoo et al. | |
| 2006/0063063 | A1* | 3/2006 | Mori | H01M 10/0585 |
| | | | | 429/61 |
| 2010/0233528 | A1 | 9/2010 | Kim et al. | |
| 2014/0349149 | A1 | 11/2014 | Kim | |
| 2015/0279574 | A1 | 10/2015 | So et al. | |
| 2017/0098813 | A1 | 4/2017 | Yoo et al. | |
| 2020/0196450 | A1* | 6/2020 | Nestle | H01M 50/216 |
| 2022/0231345 | A1* | 7/2022 | Hwangbo | H01M 50/536 |
| 2023/0246244 | A1 | 8/2023 | Hwangbo et al. | |
| 2023/0327303 | A1* | 10/2023 | Kim | H01M 50/188 |
| | | | | 429/163 |
| 2024/0136664 | A1* | 4/2024 | Jo | H01M 50/474 |

FOREIGN PATENT DOCUMENTS

| | | | |
|---|---|---|---|
| CN | 101834304 | A | 9/2010 |
| CN | 102916159 | A | 2/2013 |
| CN | 103915587 | A | 7/2014 |
| CN | 104952635 | A | 9/2015 |
| CN | 205319258 | U | 6/2016 |
| CN | 106560939 | A | 4/2017 |
| CN | 207398190 | U | 5/2018 |
| CN | 208062214 | U | 11/2018 |
| CN | 209133626 | A | 7/2019 |
| CN | 209133626 | U | 7/2019 |
| CN | 110379943 | A | 10/2019 |
| CN | 209786120 | U | 12/2019 |
| CN | 111384353 | A | 7/2020 |
| CN | 112072058 | A | 12/2020 |
| CN | 112310569 | A | 2/2021 |
| CN | 112310574 | A | 2/2021 |
| CN | 112510244 | A | 3/2021 |
| CN | 112510326 | A | 3/2021 |
| CN | 112701422 | A | 4/2021 |
| CN | 112909445 | A | 6/2021 |
| CN | 113258124 | A | 8/2021 |
| EP | 1595298 | B1 | 9/2010 |
| EP | 2924762 | A2 | 9/2015 |
| EP | 4044334 | A2 | 8/2022 |
| EP | 4199206 | A1 | 6/2023 |
| GB | 1206627 | A | 9/1970 |
| JP | H1167279 | A | 3/1999 |
| JP | 2000106165 | A | 4/2000 |
| JP | 2004362956 | A | 12/2004 |
| JP | 2005129433 | A | 5/2005 |
| JP | 2008066040 | A | 3/2008 |
| JP | 2012124007 | A | 6/2012 |
| JP | 2019083151 | A | 5/2019 |
| JP | 2024500670 | A | 1/2024 |
| JP | 2024501458 | A | 1/2024 |
| JP | 2024514664 | A | 4/2024 |
| KR | 100670526 | B1 | 1/2007 |
| KR | 20130006274 | A | 1/2013 |
| KR | 20150120261 | A | 10/2015 |
| WO | 2022158864 | A2 | 7/2022 |
| WO | 2022177371 | A1 | 8/2022 |
| WO | 2022223531 | A1 | 10/2022 |

OTHER PUBLICATIONS

Notice of Reasons for Refusal dated Jul. 1, 2024 received in Japanese Patent Application No. 2023-536182.
First Office Action dated May 24, 2023 received in Chinese Patent Application No. CN 202111399402.X.
First Office Action dated May 24, 2023 received in Chinese Patent Application No. CN 202111398785.9.
First Office Action dated May 23, 2023 received in Chinese Patent Application No. CN 202111409269.1.
International Search Report and Written Opinion dated Mar. 28, 2022 received in International Application No. PCTCN2021125099.
Extended European Search Report dated Oct. 5, 2023 received in European Patent Application No. EP 21806119.0.
Extended European search report dated Oct. 25, 2024 received in European Patent Application No. 24190325.1.
Notice of Reasons for Refusal dated Sep. 2, 2024 received in Japanese Patent Application No. 2023-547133.
Request for the Submission of an Opinion dated Mar. 20, 2025 received in Korean Patent Application No. 10-2023-7019717.
Request for the Submission of an Opinion dated Mar. 25, 2025 received in Korean Patent Application No. 10-2023-7026248.
Office Action dated Feb. 28, 2025 received in U.S. Appl. No. 18/398,175.
Decision to Grant a Patent dated Dec. 9, 2024 received in Japanese Patent Application No. 2023-547133.
Decision to Grant a Patent dated Dec. 2, 2024 received in Japanese Patent Application No. 2023-536182.
Extended European search report dated Apr. 2, 2025 received in European Patent Application No. 21949060.4.
Office Action dated Mar. 17, 2026 received in European Patent Application No. 24190325.1.

* cited by examiner

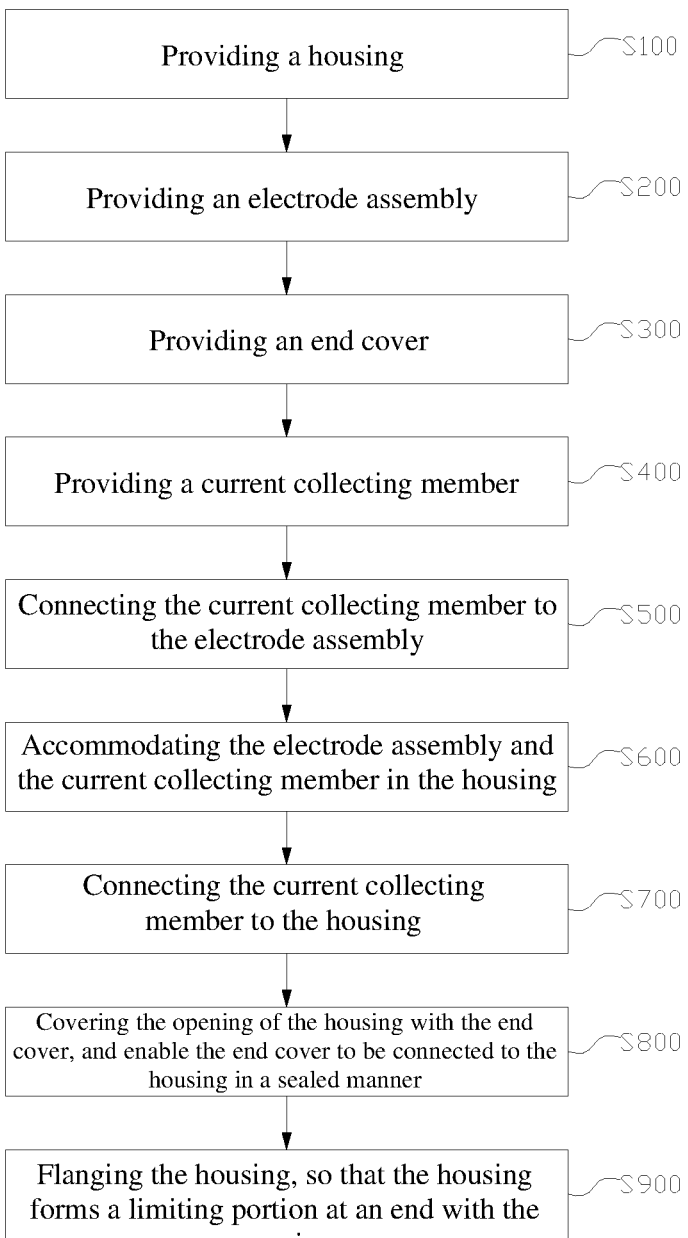

Providing a housing — S100

Providing an electrode assembly — S200

Providing an end cover — S300

Providing a current collecting member — S400

Connecting the current collecting member to the electrode assembly — S500

Accommodating the electrode assembly and the current collecting member in the housing — S600

Connecting the current collecting member to the housing — S700

Covering the opening of the housing with the end cover, and enable the end cover to be connected to the housing in a sealed manner — S800

Flanging the housing, so that the housing forms a limiting portion at an end with the — S900

FIG. 11

BATTERY CELL, BATTERY, POWER CONSUMPTION DEVICE, AND BATTERY CELL MANUFACTURING METHOD AND DEVICE

CROSS-REFERENCE TO RELATED APPLICATIONS

This application is a continuation of International Application No. PCT/CN2021/104779, filed on Jul. 6, 2021, the disclosure of which is hereby incorporated by reference in its entirety.

FIELD OF TECHNOLOGY

This application relates to the technical field of batteries, and more specifically, to a battery cell, a battery, a power consumption device, and a battery cell manufacturing method and device.

BACKGROUND

Lithium-ion batteries are commonly used in vehicles. As a rechargeable battery, lithium-ion batteries have advantages of small size, high energy density, high power density, high cycle times, and long storage time.

A battery cell usually includes a housing and an electrode assembly. The housing is configured to accommodate an electrode assembly and electrolyte solution. The electrode assembly usually includes a positive electrode plate and a negative electrode plate, and electric energy is generated by movement of metal ions (such as lithium ions) between the positive electrode plate and the negative electrode plate.

For a common battery cell, the electrode assembly needs to be electrically connected to the housing, so that the housing serves as a positive output electrode or a negative output electrode of the battery cell. At present, it is inconvenient to realize electric connection between the electrode assembly and the housing.

SUMMARY

The embodiments of this application provide a battery cell, a battery, a power consumption device, and a battery cell manufacturing method and device, which can realize electrical connection between the electrode assembly and the housing more conveniently.

According to a first aspect, an embodiment of this application provides a battery cell, including: a housing with an opening; an electrode assembly accommodated in the housing; an end cover covering the opening and being connected to the housing in a sealed manner; and a current collecting member accommodated in the housing and being located on a side of the electrode assembly facing the end cover, where the current collecting member is configured to be connected to the housing and the electrode assembly, so that the electrode assembly is electrically connected to the housing.

In the foregoing technical solution, the current collecting member is located on a side of the electrode assembly facing the end cover, the electrode assembly is electrically connected to the housing through the current collecting member, the end cover covers the opening of the housing, and the end cover is connected to the housing in a sealed manner. This structure allows that in a process of assembling the battery cell, the current collecting member may be connected to the housing inside the housing, by which firmness of the current collecting member and the housing after being connected may be ensured. After the current collecting member is connected to the electrode assembly and the housing, the end cover covers the opening of the housing and is connected to the housing in a sealed manner, which makes the electrical connection between the electrode assembly and the housing more convenient.

In some embodiments, the current collecting member is connected to an inner side surface of the housing.

In the foregoing technical solution, the current collecting member is connected to the inner side surface of the housing, so that the current collecting member and the housing have a larger contact area, which may effectively improve the firmness of connection between the current collecting member and the housing.

In some embodiments, an outer side surface of the end cover is arranged opposite to the inner side surface of the housing; and at least a part of the current collecting member is located between the outer side surface of the end cover and the inner side surface of the housing, and the end cover is configured to abut a part of the current collecting member against the inner side surface of the housing.

In the foregoing technical solution, at least a part of the current collecting member is located between the outer side surface of the end cover and the inner side surface of the housing, and the end cover abuts a part of the current collecting member against the inner side surface of the housing, so that the current collecting member is in close contact with the housing, which improves the firmness of connection between the current collecting member and the housing.

In some embodiments, the current collecting member includes a first connection portion and a second connection portion; in a thickness direction of the end cover, at least a part of the first connection portion is located between the end cover and the electrode assembly, and the first connection portion is configured to be connected to the electrode assembly; and the second connection portion is connected to the first connection portion and extends, departing from the electrode assembly, from the first connection portion along the thickness direction of the end cover, and the second connection portion is configured to be connected to the housing.

In the foregoing technical solution, the current collecting member includes a first connection portion and a second connection portion that are connected to each other, and in the thickness direction of the end cover, at least a part of the first connection portion is located between the end cover and the electrode assembly, facilitating connection between the first connection portion and the electrode assembly. The second connection portion extends, departing from the electrode assembly, from the first connection portion along the thickness direction of the end cover, facilitating connection between the second connection portion and the housing. An overall structure of the current collecting member is simple, and it is easy to be formed and manufactured.

In some embodiments, the second connection portion is in an annular structure connected to an outer edge of the first connection portion.

In the foregoing technical solution, the second connection portion is in an annular structure connected to the outer edge of the first connection portion, which is easy to be formed and manufactured, so that the second connection portion has a larger contact area with the housing.

In some embodiments, the housing is provided with a limiting portion at one end of the opening; and the limiting portion is configured to restrict the end cover from separating from the housing along a direction departing from the electrode assembly.

In the foregoing technical solution, the housing is provided with the limiting portion at one end of the opening, the limiting portion serves to restrict the end cover from separating from the housing along the direction departing from the electrode assembly.

In some embodiments, in the thickness direction of the end cover, at least a part of the end cover is located between the limiting portion and the current collecting member, and the limiting portion and the current collecting member jointly restrict the end cover from moving in the thickness direction of the end cover.

In the foregoing technical solution, in the thickness direction of the end cover, at least a part of the end cover is located between the limiting portion and the current collecting member, and both the limiting portion and the current collecting member may serve to restrict the end cover from moving in the thickness direction.

In some embodiments, the inner surface of the housing includes a stepped face; and in the thickness direction of the end cover, at least a part of the end cover is located between the limiting portion and the stepped face, and the limiting portion and the stepped face jointly restrict the end cover from moving in the thickness direction of the end cover.

In the foregoing technical solution, in the thickness direction of the end cover, at least a part of the end cover is located between the limiting portion and the stepped face of the housing, and both the limiting portion and the stepped face may serve to restrict the end cover from moving in the thickness direction.

In some embodiments, the limiting portion is in an annular structure.

In the foregoing technical solution, the limiting portion is in the annular structure, and is easy to be formed and manufactured. The limiting portion may serve to restrict the end cover all around, which ensures a limiting ability of the limiting portion to the end cover.

In some embodiments, the limiting portion is in a flanging structure in which the housing is partially folded inward.

In the foregoing technical solution, the limiting portion is in the flanging structure in which the housing is partially folded inward, that is, the limiting portion may be formed at an opening position of the housing by folding the housing, and is easy to be formed. In the process of assembling the battery cell, the current collecting member may be first accommodated in the housing and connected to the electrode assembly and the housing, and then the end cover covers the opening of the housing, and finally the limiting portion is formed by folding the housing to restrict the end cover.

In some embodiments, the inner surface of the housing includes a stepped face; and the current collecting member abuts against the stepped face along a direction facing the electrode assembly.

In the foregoing technical solution, the current collecting member abuts against the stepped face of the housing along the direction facing the electrode assembly, and the stepped face serves to restrict the current collecting member from moving along the direction facing the electrode assembly. After the current collecting member abuts against the stepped face, the current collecting member may be connected to the housing, and the current collecting member may be installed conveniently.

In some embodiments, the battery cell further includes a sealing element; and the end cover is connected to the housing in a sealed manner through the sealing element.

In the foregoing technical solution, the end cover is connected to the housing in a sealed manner through the sealing element, so as to ensure sealing performance of the end cover and the housing.

In some embodiments, the sealing element is configured to insulate and isolate the housing from the end cover.

In the foregoing technical solution, the sealing element insulates and isolates the housing from the end cover. In other words, the sealing element plays a sealing and insulating role between the housing and the end cover, which ensures the sealing performance of the end cover and the housing, and also reduces a conductive risk of the end cover.

In some embodiments, the sealing element is configured to wrap the end cover along a circumferential direction of the opening.

In the foregoing technical solution, the sealing element wraps in the end cover along the circumferential direction of the opening. On the one hand, the sealing performance of the sealing element to the end cover and the housing is improved, and on the other hand, integrity of the sealing element and the housing is improved. In the process of assembling the battery cell, the sealing element may wrap in the end cover first, and then the end cover and the sealing element are mounted in the housing as a whole.

In some embodiments, the housing is provided with a limiting portion at one end of the opening, and in the thickness direction of the end cover, at least a part of the sealing element is located between the end cover and the limiting portion, so as to realize sealing connection between the end cover and the housing.

In the foregoing technical solution, the limiting portion serves to restrict the end cover from separating from the housing along the direction departing from the electrode assembly. At least a part of the sealing element is located between the end cover and the limiting portion, which realizes the sealing connection between the end cover and the housing, and ensures good sealing performance between the end cover and the housing.

In some embodiments, the sealing element includes an enclosing body and a third connection portion, and the third connection portion is connected to the enclosing body; and at least a part of the end cover is located in the enclosing body, and in the thickness direction of the end cover, the third connection portion is located between the end cover and the limiting portion, so as to realize the sealing connection between the end cover and the housing.

In the foregoing technical solution, the sealing element includes the enclosing body and the third connection portion that are connected to each other, at least a part of the end cover is located in the enclosing body, and the third connection portion is located between the end cover and the limiting portion. The sealing element has a simple structure, and while achieving the good sealing performance between the end cover and the housing, the sealing element and the end cover have good integrity.

In some embodiments, the electrode assembly includes a first tab, and the first tab is configured to be connected to the current collecting member; and the battery cell further includes an insulating element, and in the thickness direction of the end cover, the insulating element is located between the first tab and the end cover, and a projection of the insulating element along the thickness direction of the end cover covers the first tab.

In the foregoing technical solution, in the thickness direction of the end cover, the insulating element is located between the first tab and the end cover, and the projection of the insulating element along the thickness direction of the end cover covers the first tab. The insulating element serves to isolate the end cover from the first tab, and reduces a conductive risk of the end cover.

In some embodiments, the electrode assembly includes a main body and a first tab, the first tab is in a cylindrical structure, one end of the first tab is connected to the main body, and the other end of the first tab is welded to the current collecting member.

In the foregoing technical solution, the first tab of the electrode assembly is in the cylindrical structure, and an end of the first tab away from the main body is welded to the current collecting member. This structure may ensure the firmness of the connection between the first tab and the current collecting member, and simplify a connection process of the first tab and the current collecting member.

In some embodiments, the current collecting member is welded to the housing.

In the foregoing technical solution, the current collecting member is welded to the housing. A connection manner between the current collecting member and the housing is simple, and can ensure the firmness of connection between the current collecting member and the housing.

In some embodiments, a melting point of the current collecting member is lower than a melting point of the housing.

In the foregoing technical solution, the melting point of the current collecting member is lower than the melting point of the housing. When the current collecting member is welded to the housing from an inside of the housing, the housing is not prone to be broken down, which effectively reduces a liquid leakage risk of the housing.

In some embodiments, the battery cell further includes a pressure relief mechanism; and the pressure relief mechanism is disposed on the end cover, and the pressure relief mechanism is configured to be actuated when an internal pressure or temperature of the battery cell reaches a threshold, so as to relieve the internal pressure.

In the foregoing technical solution, the end cover is provided with the pressure relief mechanism, and the pressure relief mechanism can be actuated when the internal pressure or temperature of the battery cell reaches the threshold to release the internal pressure, so as to improve the safety of the battery cell.

According to a second aspect, an embodiment of this application provides a battery, including a plurality of the battery cells according to any embodiment of the first aspect.

According to a third aspect, an embodiment of this application provides a power consumption device, including a plurality of battery cells according to any embodiment of the first aspect.

According to a fourth aspect, an embodiment of this application provides a battery cell manufacturing method, including: providing a housing with an opening; providing an electrode assembly; providing an end cover; providing a current collecting member; connecting the current collecting member to the electrode assembly; accommodating the electrode assembly and the current collecting member in the housing; connecting the current collecting member to the housing, so that the electrode assembly is electrically connected to the housing; and covering the opening with the end cover, and enabling the end cover to be connected to the housing in a sealed manner, so that the current collecting member is located on a side of the electrode assembly facing the end cover.

In some embodiments, the connecting the current collecting member to the housing includes: welding the current collecting member to the housing from an inside of the housing, where a melting point of the current collecting member is lower than a melting point of the housing.

In the foregoing technical solution, the melting point of the current collecting member is lower than the melting point of the housing. When the current collecting member is welded to the housing from the inside of the housing, the housing is not prone to be broken down, which effectively reduces a liquid leakage risk of the housing.

In some embodiments, the manufacturing method further includes: after covering the opening with the end cover, flanging the housing, so that the housing forms a limiting portion at an end with the opening, so that the limiting portion restricts the end cover from separating from the housing along a direction departing from the electrode assembly.

In the foregoing technical solution, after covering the opening with the end cover, flanging the housing, so that the housing forms the limiting portion at an end with the opening, so as to restrict the end cover from separating from the housing along the direction departing from the electrode assembly. The limiting portion is formed by flanging, which is simple to realize and can effectively reduce manufacturing costs.

According to a fifth aspect, an embodiment of this application further provides a battery cell manufacturing device, including:

a first providing apparatus configured to provide a housing with an opening; a second providing apparatus configured to provide an electrode assembly; a third providing apparatus configured to provide an end cover; a fourth providing apparatus configured to provide a current collecting member; and an assembling apparatus configured to: connect the current collecting member to the electrode assembly; accommodate the electrode assembly and the current collecting member in the housing; connect the current collecting member to the housing, so that the electrode assembly is electrically connected to the housing; and cover the opening with the end cover, and enable the end cover to be connected to the housing in a sealed manner, so that the current collecting member is located on a side of the electrode assembly facing the end cover.

BRIEF DESCRIPTION OF THE DRAWINGS

To illustrate the technical solutions in the embodiments of this application more clearly, the following will briefly introduce the drawings that need to be used in the embodiments. It should be understood that the drawings described below show only some embodiments of this application and should not be regarded as a limitation of scope, and for a person of ordinary skill in the art, other related drawings may also be obtained based on these drawings without creative work.

FIG. 11 is a flowchart of a battery cell manufacturing method according to other some embodiments of this application.

DETAILED DESCRIPTION OF THE EMBODIMENTS

Figure 1:
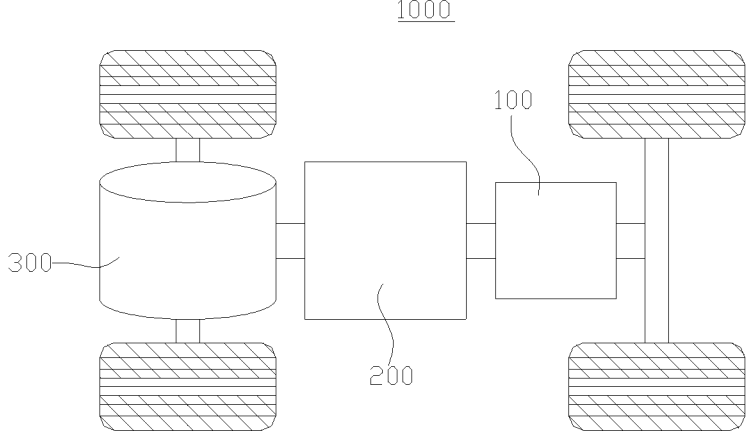
FIG. 1 is a schematic structural view of a vehicle according to some embodiments of this application.

To make objectives, technical solutions, and advantages of the embodiments of this application clearer, the technical solutions in the embodiments of this application will be clearly described below in combination with the accompanying drawings in the embodiments of this application. Obviously, the described embodiments are a part of the embodiments of this application, rather than all of the embodiments. Based on the embodiments in this application, all other embodiments obtained by a person of ordinary skill in the art without creative work shall fall within the protection scope of this application.

Unless otherwise defined, all technical and scientific terms used in this application have the same meaning as those commonly understood by those skilled in the technical field of this application; the terms used in the specification of this application are only for describing specific embodiments, and are not intended to restrict this application; the terms "include" and "have" in the specification and claims of this application and in the foregoing brief description of the drawings and any variations thereof are intended to cover non-exclusive inclusions. Terms "first", "second", and the like in the specification and claims of this application or in the foregoing drawings are used to distinguish different objects, rather than to describe a specific order or primary-secondary relationship.

The "embodiment" in this application means that specific features, structures, or characteristics described in combination with the embodiments may be included in at least one embodiment of this application. The phrase existing in different places of the specification does not necessarily refer to the same embodiment, nor is it an independent or alternative embodiment mutually exclusive with other embodiments.

In the description of this application, it should be noted that, unless specifically defined and limited otherwise, the terms "install", "link", "connect", and "attach" should be understood in a broad sense, for example, it may be a fixed connection, a detachable connection, or integral connection; it may be a direct link or an indirect link through an intermediary, and it can be an internal connection between two elements. For a person of ordinary skill in the art, the specific meanings of the foregoing terms in this application may be understood according to specific circumstances.

The term "and/or" used in this application is only an association relationship describing associated objects, which means that there can be three types of relationships, for example, A and/or B may mean that there is A alone, there are A and B, and there is B alone. In addition, the character "/" in this application usually indicates that the associated objects before and after are in an "or" relationship.

In the embodiments of this application, same signs in the drawings refer to same components, and for brevity, detailed descriptions of the same component are omitted in different embodiments. It should be understood that thickness, length, width and other dimensions of components in the embodiments of this application shown in the drawings, as well as overall thickness, length, and width of an integrated apparatus are only an example of descriptions, and should not constitute any limitation to this application.

"A plurality of" in this application refers to two or more (including two).

In this application, the battery cell may include a lithium ion secondary battery, a lithium ion primary battery, a lithium sulfur battery, a sodium lithium ion battery, a sodium ion battery, a magnesium ion battery, or the like. The embodiments of this application set no limitation thereto. The battery cell may be cylindrical, flat, rectangular, or in other shapes. The embodiments of this application also set no limitation thereto. The battery cells are usually divided into three types according to encapsulation methods: a cylindrical battery cell, a square battery cell, and a soft pack battery cell. The embodiments of this application set no limitation thereto.

The battery mentioned in the embodiments of this application refers to a single physical module that includes one or more battery cells to provide higher voltage and capacity. For example, the battery mentioned in this application may include a battery module, a battery pack, or the like. The battery usually includes a box body for encapsulating one or more battery cells. The box body may prevent liquid or other foreign matters from affecting charging or discharging of the battery cell.

The battery cell includes an electrode assembly and an electrolyte solution. The electrode assembly includes a positive electrode plate, a negative electrode plate, and a separator. The battery cell mainly operates by metal ions moving between the positive electrode plate and the negative electrode plate. The positive electrode plate includes positive current collectors and positive active substance layers. The positive active substance layer is coated on a surface of the positive current collector. A positive current collector that is not coated with the positive active substance layer protrudes from the positive current collector that has been coated with the positive active substance layer, and the positive current collector that is not coated with the positive active substance layer serves as a positive tab. Taking a lithium ion battery as an example, material of the positive current collector may be aluminum, and the positive active substance may be lithium cobaltate, lithium iron phosphate, ternary lithium, lithium manganate, or the like. The negative electrode plate includes negative current collectors and negative active substance layers. The negative active substance layer is coated on a surface of the negative current collector. A negative current collector that is not coated with the negative active substance layer protrudes from the negative current collector that has been coated with the negative active substance layer, and the negative current collector that is not coated with the negative active substance layer serves as a negative tab. Material of the negative current collector may be copper, and negative active substance may be carbon, silicon, or the like. To ensure that large currents are passed without fusing, there are a plurality of positive tabs stacked together, and there are also a plurality of negative tabs stacked together. Material of the separator may be polypropylene (PP), polyethylene (PE), or the like. In addition, the electrode assembly may be in a winding structure or a laminated structure. This is not limited in the embodiments of this application.

Many design factors should also be considered in development of battery technologies, for example, energy density, cycle life, discharge capacity, charge and discharge rate, and other performance parameters. In addition, the safety of the battery also needs to be considered.

For the battery cell, a main safety hazard is from charging and discharging processes, as well as a suitable environmental temperature design. There are usually at least triple protection measures for the battery cell to effectively avoid unnecessary losses. Specifically, the protection measures include at least switching elements, selection of appropriate separator materials, and pressure relief mechanisms. The switching element refers to an element that can stop the battery from charging or discharging when a temperature or resistance in the battery cell reaches a certain threshold. The separator is configured to isolate the positive electrode plate from the negative electrode plate, and may automatically dissolve micron-scale (or even nanometric-scale) micropores attached to the separator when the temperature rises to a certain value, so that metal ions cannot pass through the separator, thereby terminating internal reaction of the battery cell.

The pressure relief mechanism refers to an element or component that is actuated when the internal pressure or temperature of the battery cell reaches a predetermined threshold to release the internal pressure and temperature. The threshold design varies according to different design requirements. The threshold may depend on one or more materials of the positive electrode plate, the negative electrode plate, the electrolyte solution, and the separator in the battery cell. The pressure relief mechanism may be in the form of an explosion-proof valve, a rupture disc, a gas valve, a pressure relief valve, a safety valve, or the like, and specifically, the pressure relief mechanism may adopt pressure-sensitive or temperature-sensitive elements or structures. In other words, when the internal pressure or temperature of the battery cell reaches the predetermined threshold, the pressure relief mechanism performs an action or a weak structure in the pressure relief mechanism is destroyed to form an opening or channel for internal pressure or temperature relief.

The "actuation" mentioned in this application means that the pressure relief mechanism acts or is activated to a certain state, so that the internal pressure and temperature of the battery cell may be released. The action generated by the pressure relief mechanism may include, but is not limited to: at least a part of the pressure relief mechanism is ruptured, broken, torn, or opened. When the pressure relief mechanism is actuated, high-temperature and high-pressure substances inside the battery cell will be discharged from an actuated part as emissions. In this way, the pressure and temperature of the battery cell can be released under a controllable pressure or temperature, thereby avoiding occurrence of potentially more serious accidents.

The emissions from the battery cell that are mentioned in this application include but are not limited to: electrolyte solution, dissolved or split positive and negative electrode plates, fragments of the separator, high temperature and high pressure gas generated after the reaction, and flames.

The pressure relief mechanism on the battery cell has an important impact on the safety of the battery. For example, short circuit, overcharge, and other phenomena may cause thermal runaway inside the battery cell, resulting in a sudden increase in pressure or temperature. In this case, the internal pressure and temperature may be released outward by the actuation of the pressure relief mechanism to prevent the battery cell from exploding and firing.

For a common battery cell, the electrode assembly needs to be electrically connected to the housing, so that the housing serves as a positive output electrode or a negative output electrode of the battery cell. At present, it is inconvenient to realize electric connection between the electrode assembly and the housing.

The applicant found that in the battery cell, since the housing is in a hollow structure with an open top, that the electrode assembly is electrically connected to the housing usually refers to welding a bottom wall of the housing to tabs of the electrode assembly from an outside of the housing, so as to realize the electrical connection between the electrode assembly and the housing. Since the tabs are located inside the housing, it is impossible to determine a welding condition between the tabs and the bottom wall of the housing, and it is relatively inconvenient to realize the electrical connection between the electrode assembly and the housing.

In view of this, the embodiments of this application provide a technical solution. By disposing the current collecting member on a side of the electrode assembly facing the end cover, the electrode assembly is electrically connected to the housing through the current collecting member. The end cover covers the opening of the housing, and the end cover is connected to the housing in a sealed manner. In a process of assembling the battery cell, the current collecting member may be connected to the housing inside the housing, by which firmness of the current collecting member and the housing after being connected may be ensured. After the current collecting member is connected to the electrode assembly and the housing, the end cover covers the opening of the housing and is connected to the housing in a sealed manner, which makes the electrical connection between the electrode assembly and the housing more convenient.

The technical solutions described in the embodiments of this application are applicable to batteries and power consumption devices using batteries.

The power consumption devices may be vehicles, mobile phones, portable devices, notebook computers, ships, spacecrafts, electric toys, electric tools, and the like. The vehicles may be fuel vehicles, gas vehicles or new energy vehicles, the new energy vehicles may be pure electric vehicles, hybrid vehicles, extended-range vehicles, or the like; the spacecrafts include airplanes, rockets, space shuttles, spacecrafts, and the like; the electric toys include fixed or mobile electric toys such as game consoles, electric car toys, electric ship toys, electric airplane toys, and the like; the electric tools include metal cutting electric tools, grinding electric tools, assembly electric tools, and railway electric tools, for example, electric drills, electric grinders, electric wrenches, electric screwdrivers, electric hammers, electric impact drills, concrete vibrators, and electric planers. The embodiments of this application set no special limitation on the foregoing power consumption devices.

For ease of description, in the following embodiments, a vehicle is used as the electric device for description.

Please refer to FIG. 1, FIG. 1 is a schematic structural view of a vehicle 1000 according to some embodiments of this application. A battery 100 is provided inside the vehicle 1000, and the battery 100 may be disposed on the bottom, head, or tail of the vehicle 1000. The battery 100 may be configured to supply power to the vehicle 1000, for example, the battery 100 may be configured as an operating power source of the vehicle 1000.

The vehicle 1000 may further include a controller 200 and a motor 300. The controller 200 is configured to control the battery 100 to supply power to the motor 300, for example, configured to meet working power requirements of the vehicle 1000 during starting, navigating, and driving.

In some embodiments of this application, the battery 100 may be configured not only as the operating power source for the vehicle 1000, but also as a driving power source for the vehicle 1000, replacing or partially replacing fuel or natural gas to provide driving power for the vehicle 1000.

Figure 2:
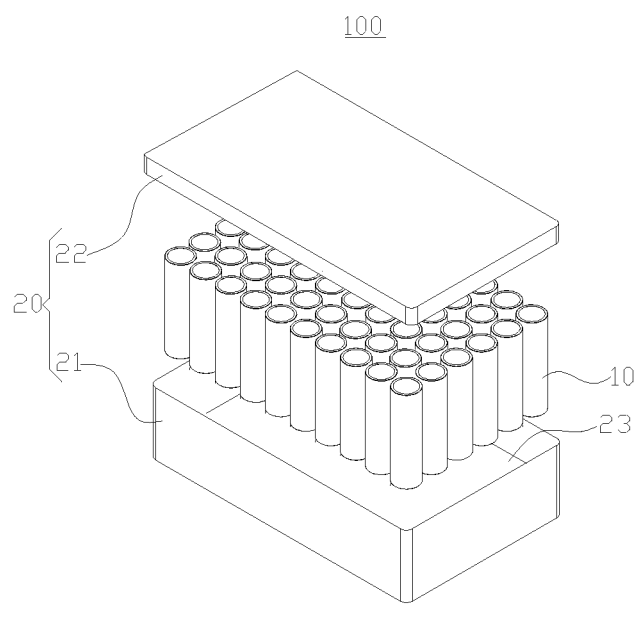
FIG. 2 is a schematic structural view of a battery according to some embodiments of this application.

In some embodiments, please refer to FIG. 2, FIG. 2 is a schematic structural view of a battery 100 according to some embodiments of this application. The battery 100 includes a plurality of battery cells 10. The plurality of battery cells 10 may be connected in series or in parallel or in parallel-series. The parallel-series connection means that the plurality of battery cells 10 are both connected in series and in parallel.

In some embodiments, the battery 100 may further include a bus component (not shown in the view), and the plurality of battery cells 10 may be electrically connected through the bus component to realize connection in series or in parallel or in parallel-series of the plurality of battery cells 10.

The bus component may be a metal conductor, such as copper, iron, aluminum, steel, and aluminum alloy.

In some embodiments, the battery cell 10 may further include a box body 20, and the box body 20 is configured to accommodate the battery cell 10. The box body 20 may include a first part 21 and a second part 22, and the first part 21 and the second part 22 are covered with each other to define an accommodation space 23 for accommodating the battery cell 10. Certainly, a connection between the first part 21 and the second part 22 may be sealed by a sealing element (not shown in the view), and the sealing element may be a sealing ring, a sealant, or the like.

The first part 21 and the second part 22 may be in various shapes, such as a cylinder or a cuboid. The first part 21 may be in a hollow structure with one side open, and the second part 22 may also be in a hollow structure with one side open. The opening side of the second part 22 is covered with the opening side of the first part 21 to form the box body 20 having the accommodation space 23. Certainly, the first part 21 may be in a hollow structure with one side open, and the second part 22 is in a plate-shaped structure. The second part 22 is covered with the opening side of the first part 21 to form the box body 20 having the accommodation space 23.

Figure 3:
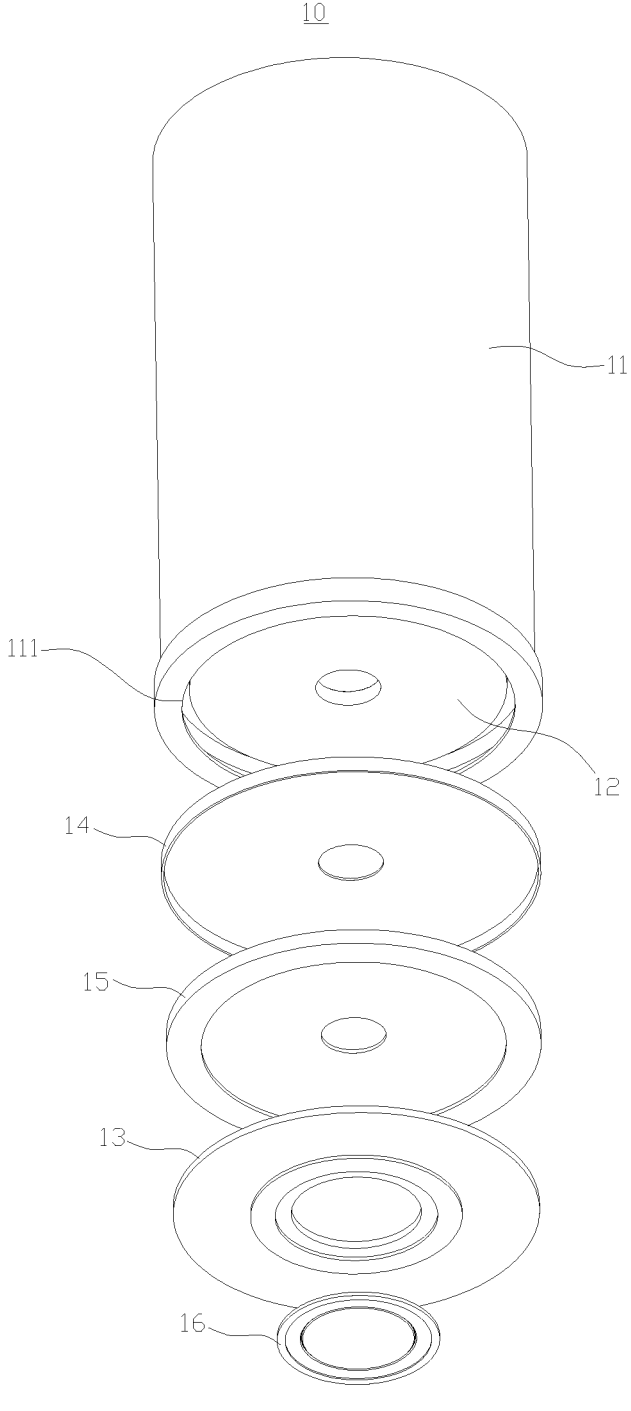
FIG. 3 is an exploded view of a battery cell according to some embodiments of this application.

Please refer to FIG. 3, FIG. 3 is an exploded view of a battery cell 10 according to some embodiments of this application. The battery cell 10 may include a housing 11, an electrode assembly 12, an end cover 13, and a current collecting member 14. The housing 11 has an opening 111, the electrode assembly 12 is accommodated in the housing 11, the end cover 13 covers the opening 111, the end cover 13 is connected to the housing 11 in a sealed manner, the current collecting member 14 is accommodated in the housing 11, and the current collecting member 14 is located on a side of the electrode assembly 12 facing the end cover 13. The current collecting member 14 is configured to be connected to the housing 11 and the electrode assembly 12, so that the electrode assembly 12 is electrically connected to the housing 11.

The end cover 13 covers the opening 111 of the housing 11 to form a sealed space 112 (not shown in FIG. 3) for accommodating the electrode assembly 12 and an electrolyte. The electrolyte may be an electrolyte solution.

Since the current collecting member 14 is located on a side of the electrode assembly 12 facing the end cover 13, the electrode assembly 12 is electrically connected to the housing 11 through the current collecting member 14, the end cover 13 covers the opening 111 of the housing 11, and the end cover 13 is connected to the housing 11 in a sealed manner. This structure allows that in a process of assembling the battery cell 10, the current collecting member 14 may be connected to the housing 11 inside the housing 11, by which firmness of the current collecting member 14 and the housing 11 after being connected may be ensured. After the current collecting member 14 is connected to the electrode assembly 12 and the housing 11, the end cover 13 covers the opening 111 of the housing 11 and is connected to the housing 11 in a sealed manner, which makes the electrical connection between the electrode assembly 12 and the housing 11 more convenient.

For a common battery cell 10, since the bottom wall of the housing 11 is welded to the tabs, during a process of welding the bottom wall of the housing 11 to the tabs, the bottom wall of the housing 11 is prone to be broken down, resulting in leakage and affecting performance of the battery cell 10. However, in the embodiments of this application, the electrode assembly 12 is electrically connected to the housing 11 through the current collecting member 14, the end cover 13 is connected to the housing 11 in a sealed manner, the electrode assembly 12 is not directly connected to the end cover 13, and the battery cell 10 is not easily to leak from the end cover 13.

In some embodiments, the battery cell 10 may further include a sealing element 15, and the end cover 13 is connected to the housing 11 in a sealed manner through the sealing element 15 to ensure sealing performance between the end cover 13 and the housing 11.

Optionally, the sealing element 15 is configured to insulate and isolate the housing 11 from the end cover 13. In other words, the sealing element 15 plays a sealing and insulating role between the housing 11 and the end cover 13, which ensures the sealing performance of the end cover 13 and the housing 11, and also reduces a conductive risk of the end cover 13.

The sealing element 15 may be made of rubber, plastic, or other materials, and the end cover 13 may be made of metal, such as copper, iron, aluminum, steel, and aluminum alloy.

In other embodiments, the end cover 13 and the housing 11 may also be sealed by a tight fit. For example, an interference fit is formed between the end cover 13 and the housing 11 to realize sealing connection between the end cover 13 and the housing 11. In this embodiment, the end cover 13 may be made of insulating material to reduce the conductive risk of the end cover 13.

In some embodiments, the battery cell 10 may further include a pressure relief mechanism 16, the pressure relief mechanism 16 is disposed on the end cover 13, and the pressure relief mechanism 16 is configured to be actuated when an internal pressure or temperature of the battery cell 10 reaches a threshold, so as to relieve the internal pressure and improve the safety of the battery cell 10.

The pressure relief mechanism 16 may be a component such as an explosion-proof valve, a rupture disc, a gas valve, or a pressure relief valve. For example, FIG. 3 shows a case where the pressure relief mechanism 16 is a rupture disc, and the rupture disc may be adhered to the end cover 13.

When the battery cell 10 is thermally out of control and discharged emissions through the pressure relief mechanism 16, the end cover 13 may be conductive. If one of the end cover 13 and the housing 11 is positively charged and the other is negatively charged, the battery cell 10 may be short-circuited. The sealing element 15 insulates and isolates the housing 11 from the end cover 13, which may effectively reduce the risk of short circuit.

In the embodiments of this application, the housing 11 may be in various shapes, such as a cylinder or a cuboid. A shape of the housing 11 may be determined according to a specific shape of the electrode assembly 12. For example, if the electrode assembly 12 is in a cylindrical structure, the housing 11 may be in a cylindrical structure; if the electrode assembly 12 is in a cuboid structure, the housing 11 may be in a cuboid structure.

For example, in FIG. 3, the housing 11 is in a hollow cylindrical structure, and the electrode assembly 12 is in a cylindrical structure.

The housing 11 may also be made of a plurality of materials, such as copper, iron, aluminum, steel, or aluminum alloy In some embodiments, a melting point of the housing 11 may be higher than a melting point of the end cover 13. For example, the housing 11 is made of steel, and the end cover 13 is made of aluminum.

When the battery cell 10 is thermally out of control, since the melting point of the end cover 13 is lower than the melting point of the housing 11, the end cover 13 is easier to melt. This reduces the possibility of the battery cell 10 exploding and impacting other battery cells 10, and reduces a risk of deformation of the entire battery 100 or even high voltage failure.

Figure 4:
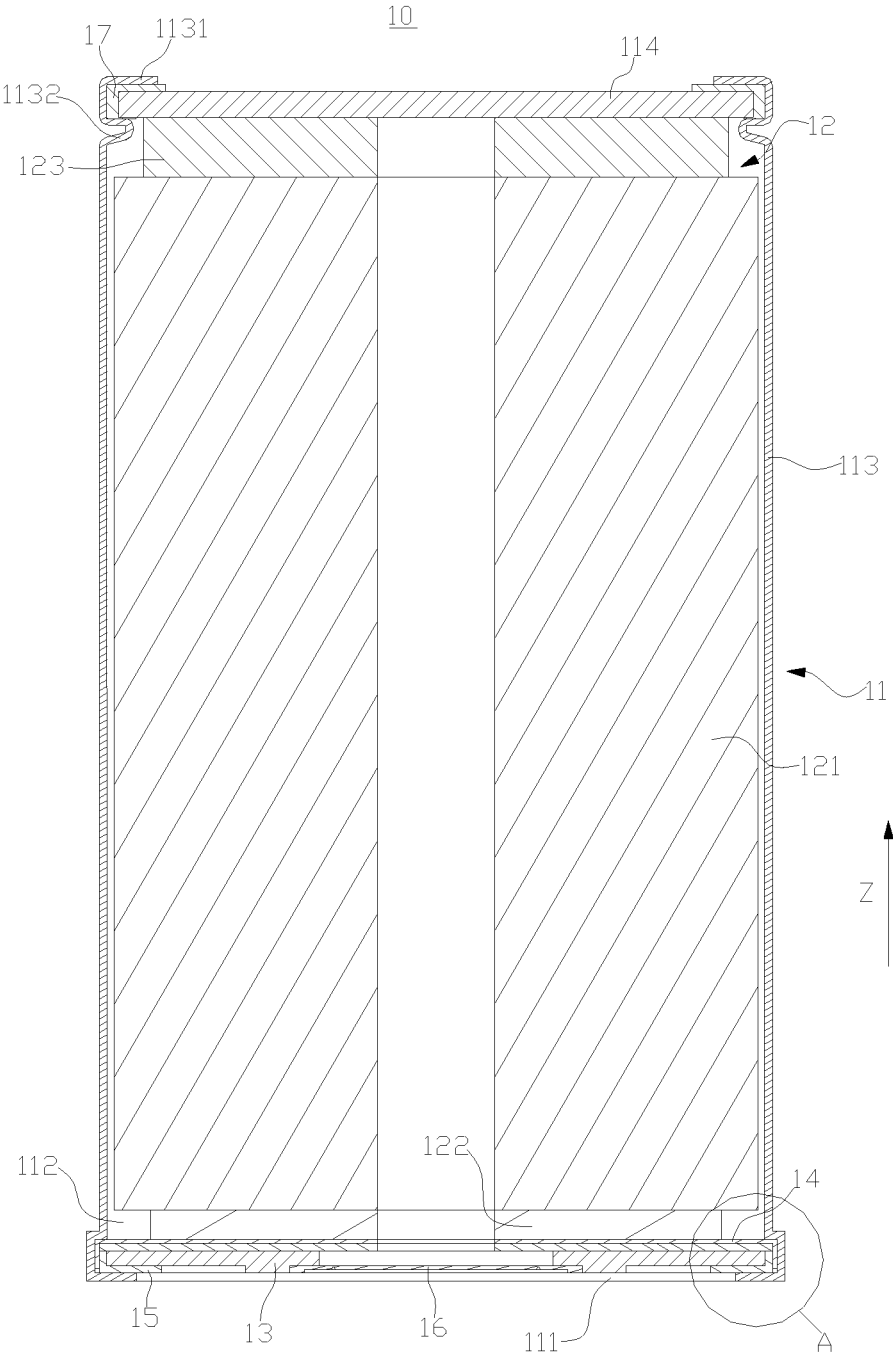
FIG. 4 is a sectional view of a battery cell shown in FIG. 3.

In some embodiments, please refer to FIG. 4. FIG. 4 is a sectional view of the battery cell 10 shown in FIG. 3. The housing 11 may include a cylinder 113 and an output portion 114. One end of the cylinder 113 is provided with an opening 111, the other end of the cylinder 113 is connected to the output portion 114, the cylinder 113 is connected to the current collecting member 14, and the output portion 114 is electrically connected to the electrode assembly 12. One of the cylinder 113 and the output portion 114 is a positive output electrode of the battery cell 10, and the other is a negative output electrode of the battery cell 10.

When the pressure relief mechanism 16 is disposed on the end cover 13, it may be understood that the pressure relief mechanism 16 and the output portion 114 are located on opposite sides of the housing 11, and the pressure relief mechanism 16 does not occupy a space of the output portion 114. This structure may ensure that the output portion 114 has a relatively large contact area with the bus component, thereby improving an overcurrent capacity. For example, the bus component is welded to the output portion 114, and the output portion 114 and the bus component have a relatively large welding area.

For example, the cylinder 113 is in a cylindrical structure, and the output portion 114 is in a plate-shaped structure. The end cover 13 is configured to cover the opening 111 of the end of the cylinder 113 away from the output portion 114, and the end cover 13 may be in a circular plate-shaped structure that fits the cylinder 113.

Optionally, the cylinder 113 is formed with a flanging portion 1131 at an end away from the opening 111, the cylinder 113 is partially recessed to form a first limiting protrusion 1132, and the cylinder 113 is formed with a necking structure at a position of the first limiting protrusion 1132. In the thickness direction Z of the end cover 13, the flanging portion 1131 and the first limiting protrusion 1132 are respectively located on both sides of the output portion 114, and the flanging portion 1131 and the first limiting protrusion 1132 jointly restrict the output portion 114 from moving in the thickness direction of the end cover.

For example, both the flanging portion 1131 and the first limiting protrusion 1132 are in the annular structure.

It should be noted that in the battery cell 10, the output portion 114 may be a positive output electrode and the cylinder 113 may be a negative output electrode; or the cylinder 113 may be a negative output electrode and the output portion 114 may be a positive output electrode. The positive output electrode and the negative output electrode are the parts of the battery cell 10 for being connected to other components and outputting the electric energy of the battery cell 10. For example, two battery cells 10 are electrically connected through the bus component to realize connection in series of two battery cells 10, and both a positive output electrode of one battery cell 10 and a negative output electrode of the other battery cell 10 may be welded to the bus component.

It may be understood that the positive output electrode and the negative output electrode of the battery cell 10 are in an insulated state, and therefore, the cylinder 113 is connected to the output portion 114 in an insulated manner. In some embodiments, the cylinder 113 and the output portion 114 may be insulated and isolated through the insulating unit 17. The insulating unit 17 may be made of rubber, plastic, or other materials.

In some embodiments, the electrode assembly 12 may include a main body 121 and a tab, and the tab extends from the main body 121. The main body 121 may include a positive electrode plate, a negative electrode plate, and a separator. The main body 121 may be in a winding structure formed by winding the positive electrode plate, the separator, and the negative electrode plate. The main body 121 may also be in a stacking structure formed by stacking the positive electrode plate, the separator, and the negative electrode plate.

The positive electrode plate includes a positive current collector and a positive active substance layer coated on opposite sides of the positive current collector. The negative electrode plate includes a negative current collector and a negative active substance layer coated on opposite sides of the negative current collector. The main body 121 is a part of the electrode assembly 12 corresponding to an area where an electrode plate is coated with an active substance layer, and the tab is an area where an electrode plate is not coated with the active substance layer.

The tab may be divided into a first tab 122 and a second tab 123. The first tab 122 may be connected to the current collecting member 14 to achieve electrical connection between the electrode assembly 12 and the cylinder 113 of the housing 11; the second tab 123 may be connected to the output portion 114 to realize electrical connection between the electrode assembly 12 and the output portion 114.

For example, the first tab 122 may be in a cylindrical structure, one end of the first tab 122 is connected to the main body 121, and the other end of the first tab 122 is welded to the current collecting member 14. This structure may ensure the firmness of the connection between the first tab 122 and the current collecting member 14, and simplify a connection process of the first tab 122 and the current collecting member 14.

For example, the second tab 123 may also be in a cylindrical structure, one end of the second tab 123 is connected to the main body 121, and the other end of the second tab 123 is welded to the output portion 114. This structure may ensure the firmness of the connection between the second tab 123 and the output portion 114, and simplify a connection process of the second tab 123 and the output portion 114.

One of the first tab 122 and the second tab 123 is a positive tab, and the other is a negative tab. The positive tab is an area where the positive active substance layer is not coated on the positive electrode plate. The negative tab is an area where the negative active substance layer is not coated on the negative electrode plate.

It should be noted that if the first tab 122 is a positive tab, and the second tab 123 is a negative tab, the cylinder 113 is a positive output electrode, and the output portion 114 is a negative output electrode; if the first tab 122 is a negative tab, and the second tab is a positive tab, the cylinder 113 is a negative output electrode, and the output portion 114 is a positive output electrode.

In the embodiments of this application, the current collecting member 14 may be a metal conductor, such as copper, iron, aluminum, steel, and aluminum alloy. The current collecting member 14 may be connected to the housing 11 in a variety of manners. For example, the current collecting member 14 is welded to the housing 11, and for another example, the current collecting member 14 and the housing 11 are bonded through a conductive adhesive.

In some embodiments, the current collecting member 14 is welded to the housing 11, and a melting point of the current collecting member 14 is lower than a melting point of the housing 11.

When the current collecting member 14 is welded to the housing 11 from the inside of the housing 11, since the melting point of the current collecting member 14 is lower than the melting point of the housing 11, the housing 11 is not prone to be broken down, which effectively reduces a liquid leakage risk of the housing 11.

For example, the housing 11 is made of steel, the current collecting member 14 is made of aluminum, the melting point of the housing 11 is 1500° C., and the melting point of the current collecting member 14 is 660° C. During welding, a welding temperature may be selected from 660° C. to 1500° C. For example, the welding temperature is 800° C., which does not reach the melting point of the housing 11, and the housing 11 is not prone to be broken down during the welding process.

Specifically, the melting point of the current collecting member 14 is lower than the melting point of the cylinder 113 of the housing 11.

Figure 5:
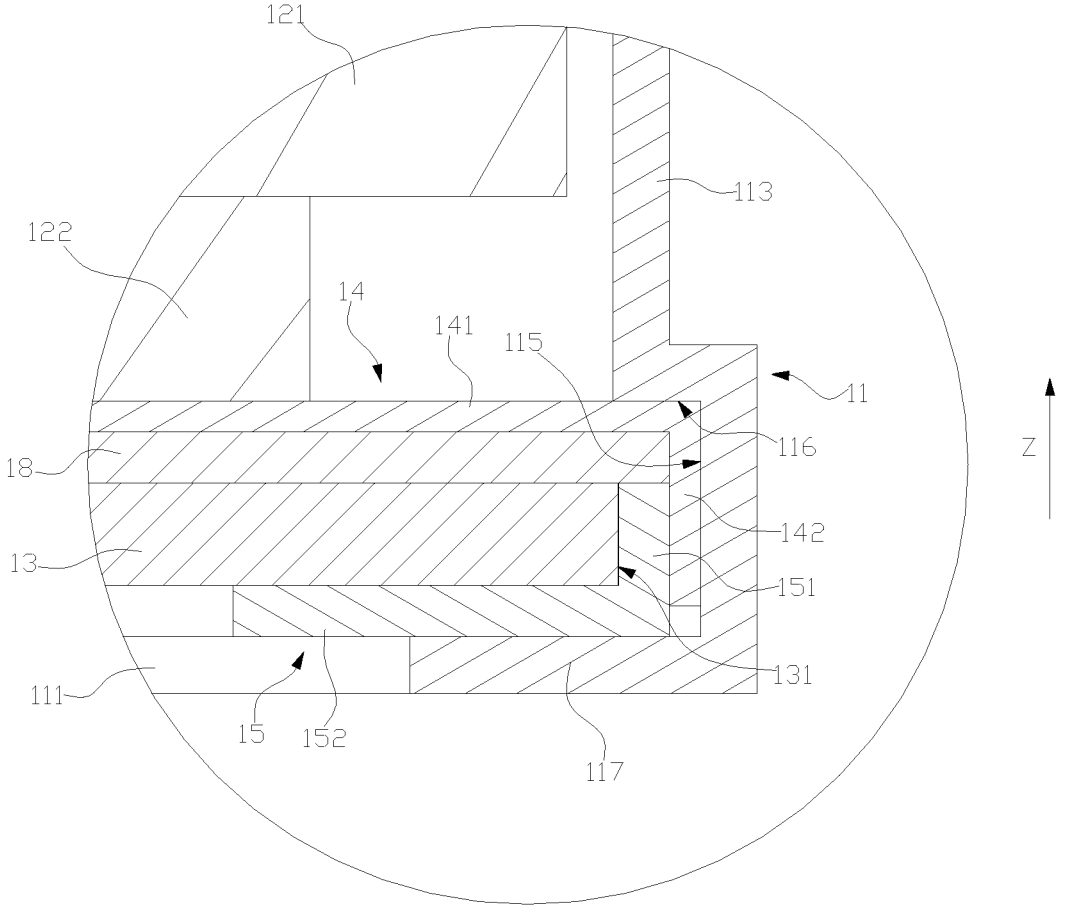
FIG. 5 is a partially enlarged view of A of a battery cell shown in FIG. 4.

In some embodiments, please refer to FIG. 5, FIG. 5 is a partially enlarged view of A of the battery cell 10 shown in FIG. 4. The current collecting member 14 is connected to the inner side surface 115 of the housing 11, and this structure allows the current collecting member 14 and the housing 11 have a relatively large contact area, which may effectively improve the firmness of connection between the current collecting member 14 and the housing 11, thereby improving the overcurrent capacity.

The inner side surface 115 of the housing 11 is a surface formed by circumferential direction movement of a bus bar along the opening 111 of the housing 11, and the bus bar herein is a line arranged along the thickness direction Z of the end cover 13. Taking the cylindrical structure of the housing 11 as an example, the inner side surface 115 of the housing 11 is an inner circumferential surface of the housing 11.

For example, the current collecting member 14 is welded to the inner side surface 115 of the housing 11.

Optionally, the outer side surface 131 of the end cover 13 is arranged opposite to the inner side surface 115 of the housing 11. At least a part of the current collecting member 14 is located between the outer side surface 131 of the end cover 13 and the inner side surface 115 of the housing 11, and the end cover 13 is configured to abut a part of the current collecting member 14 against the inner side surface 115 of the housing 11, so that the current collecting member 14 is in close contact with the housing 11, which improves the firmness of connection between the current collecting member 14 and the housing 11.

It should be noted that the end cover 13 abuts a part of the current collecting member 14 against the inner side surface 115 of the housing 11 may be that the end cover 13 directly abuts a part of the current collecting member 14 against the inner side surface 115 of the housing 11, that is, the end cover 13 directly abuts against the current collecting member 14; or the end cover 13 indirectly abuts a part of the current collecting member 14 against the inner side surface 115 of the housing 11, that is, the end cover 13 indirectly abuts against the current collecting member 14. For example, when the end cover 13 is connected to the housing 11 in a sealed manner through the sealing element 15, the end cover 13 indirectly abuts against the current collecting member 14 through the sealing element 15.

In some embodiments, the current collecting member 14 includes a first connection portion 141 and a second connection portion 142, in the thickness direction Z of the end cover 13, at least a part of the first connection portion 141 is located between the end cover 13 and the electrode assembly 12, and the first connection part 141 is configured to be connected to the electrode assembly 12 to realize electrical connection between the current collecting member 14 and the electrode assembly 12. The second connection portion 142 is connected to the first connection portion 141 and extends, departing from the electrode assembly 12, from the first connection portion 141 along the thickness direction of the end cover 13, and the second connection portion 142 is configured to be connected to the housing 11. A structure of this current collecting member 14 is simple, and it is easy to be formed and manufactured. The current collecting member 14 may not only be connected to the electrode assembly 12, but also be connected to the housing 11 conveniently.

The first connection portion 141 is configured to be connected to the first tab 122 of the electrode assembly 12, for example, the first connection portion 141 is welded to the first tab 122. The second connection portion 142 may be connected to the inner side surface 115 of the housing 11, for example, the second connection portion 142 is welded to the inner side surface 115 of the housing 11.

For example, as shown in FIG. 5, the end cover 13 abuts the second connection portion 142 of the current collecting member 14 against the inner side surface 115 of the housing 11 through the sealing element 15, so as to improve the firmness of connection between the current collecting member 14 and the housing 11.

Optionally, the second connection portion 142 is in an annular structure connected to the outer edge of the first connection portion 141. This structure enables the current collecting member 14 to be formed by stamping, which is simple and convenient. In addition, the annular second connection portion 142 has a relatively large contact area with the housing 11, which is beneficial to improve the overcurrent capacity.

In some embodiments, the inner surface of the housing 11 includes a stepped face 116, the current collecting member 14 abuts against the stepped face 116 along the direction facing the electrode assembly 12, and the stepped face 116 serves to restrict the current collecting member 14 from moving along the direction facing the electrode assembly 12.

In the process of assembling the battery cell 10, after the current collecting member 14 abuts against the stepped face 116, the current collecting member 14 may be connected to the housing 11, and the current collecting member 14 may be installed conveniently.

That the stepped face 116 is connected to the inner side surface 115 of the housing 11 may be that the first connection portion 141 of the current collecting member 14 abuts against the stepped face 116 along the direction facing the electrode assembly 12.

In some embodiments, as shown in FIG. 5, the current collecting member 14 may be connected to the inner side surface 115 of the housing 11. In other embodiments, the current collecting member 14 may not be connected to the inner side surface 115 of the housing 11, but to abut against and be connected to the stepped face 116. For example, the first connection portion 141 of the current collecting member 14 is welded to the stepped face 116, and the second connection portion 142 of the current collecting member is in contact with, but is not connected to the inner side surface 115 of the housing 11.

In some embodiments, please continue to refer to FIG. 5, the housing 11 is provided with a limiting portion 117 at one end of the opening 111, and the limiting portion 117 is configured to restrict the end cover 13 from separating from the housing 11 in a direction departing from the electrode assembly 12. In other words, the limiting portion 117 has a limiting effect on the end cover 13 and restricts the end cover 13 from separating from the housing 11 in the direction departing from the electrode assembly 12.

It may be understood that the limiting portion 117 is located at an end of the cylinder 113 of the housing 11 away from the output portion 114.

The limiting portion 117 may be in the flanging structure in which the housing 11 is partially folded inward, that is, the limiting portion 117 may be formed at an opening 111 position of the housing 11 by folding the housing 11, and is easy to be formed.

In the process of assembling the battery cell 10, the current collecting member 14 may be first accommodated in the housing 11 and connected to the electrode assembly 12 and the housing 11, and then the end cover 13 covers the opening 111 of the housing 11, and finally the limiting portion 117 is formed by folding the housing 11 to restrict the end cover 13.

To enable the limiting portion 117 to have a better limiting ability on the end cover 13, the limiting portion 117 may be configured as the annular structure. It is certainly that the annular limiting portion 117 is more easily sealed with the end cover 13.

In some embodiments, in the thickness direction Z of the end cover 13, at least a part of the end cover 13 is located between the limiting portion 117 and the current collecting member 14, and the limiting portion 117 and the current collecting member 14 jointly restrict the end cover 13 from moving in the thickness direction Z. As a result, the end cover 13 is not easy to move along the thickness direction Z of the housing 11 in the housing 11.

For example, in FIG. 5, in the thickness direction Z of the end cover 13, a part of the end cover 13 is located between the limiting portion 117 and the first connection portion 141 of the current collecting member 14.

Both the limiting portion 117 and the current collecting member 14 serve to restrict the end cover 13. The current collecting member 14 may directly or indirectly abut against the end cover 13, and the limiting portion 117 may directly or indirectly abut against the end cover 13 to restrict the end cover 13 from moving in the thickness direction Z. For example, in FIG. 5, the end cover 13 abuts against the limiting portion 117 through the sealing element 15.

In other embodiments, in the thickness direction Z of the end cover 13, at least a part of the end cover 13 is located between the limiting portion 117 and the stepped face 116, and the limiting portion 117 and the stepped face 116 jointly restrict the end cover 13 from moving in the thickness direction Z. As a result, the end cover 13 is not easy to move along the thickness direction Z of the housing 11 in the housing 11.

Both the limiting portion 117 and the stepped face 116 serve to restrict the end cover 13. The limiting portion 117 may directly or indirectly abut against the end cover 13, and the stepped face 116 may directly or indirectly abut against the end cover 13 to restrict the end cover 13 from moving in the thickness direction Z.

In some embodiments, please continue to refer to FIG. 5, when the end cover 13 is connected to the housing 11 in a sealed manner through the sealing element 15, the sealing element 15 may wrap the end cover 13 along the circumferential direction of the opening 111 of the housing 11. In this structure, on the one hand, the sealing performance of the sealing element 15 to the end cover 13 and the housing 11 is improved, and on the other hand, integrity of the sealing element 15 and the housing 11 is improved. In the process of assembling the battery cell 10, the sealing element 15 may wrap the end cover 13 first, and then the end cover 13 and the sealing element 15 are mounted in the housing 11 as a whole.

In some embodiments, when the housing 11 is provided with the limiting portion 117 at one end of the opening 111, in the thickness direction Z of the end cover 13, at least a part of the sealing element 15 is located between the end cover 13 and the limiting portion 117, so as to realize sealing connection between the end cover 13 and the housing 11, and ensure good sealing performance between the end cover 13 and the housing 11.

In some embodiments, the sealing element 15 may include an enclosing body 151 and a third connection portion 152, and the third connection portion 152 is connected to the enclosing body 151. At least a part of the end cover 13 is located in the enclosing body 151, and in the thickness direction Z of the end cover 13, the third connection portion 152 is located between the end cover 13 and the limiting portion 117, so as to realize sealing connection between the end cover 13 and the housing 11.

Since at least a part of the end cover 13 is located in the enclosing body 151, it may be realized that the sealing element 15 wraps the end cover 13 along the circumferential direction of the opening 111 of the housing 11. Since the third connection portion 152 is located between the end cover 13 and the limiting portion 117, a sealing connection between the end cover 13 and the housing 11 is realized. Even if the current collecting member 14 and the end cover 13 are not sealed, there will be no liquid leakage between the end cover 13 and the housing 11. The overall structure of the sealing element 15 is simple, and while achieving the good sealing performance between the end cover 13 and the housing 11, the sealing element 15 and the end cover 13 have good integrity.

When the sealing element 15 has insulating properties, both the enclosing body 151 and the third connection portion 152 of the sealing element 15 may perform an insulating function between the end cover 13 and the housing 11.

For example, the end cover 13 abuts the second connection portion 142 of the current collecting member 14 against the inner side surface 115 of the housing 11 through the enclosing body 151 of the sealing element 15. Both the third connection portion 152 and the limiting portion 117 are in the annular structure, and an inner diameter of the third connection portion 152 is smaller than an inner diameter of the limiting portion 117.

Figure 6:
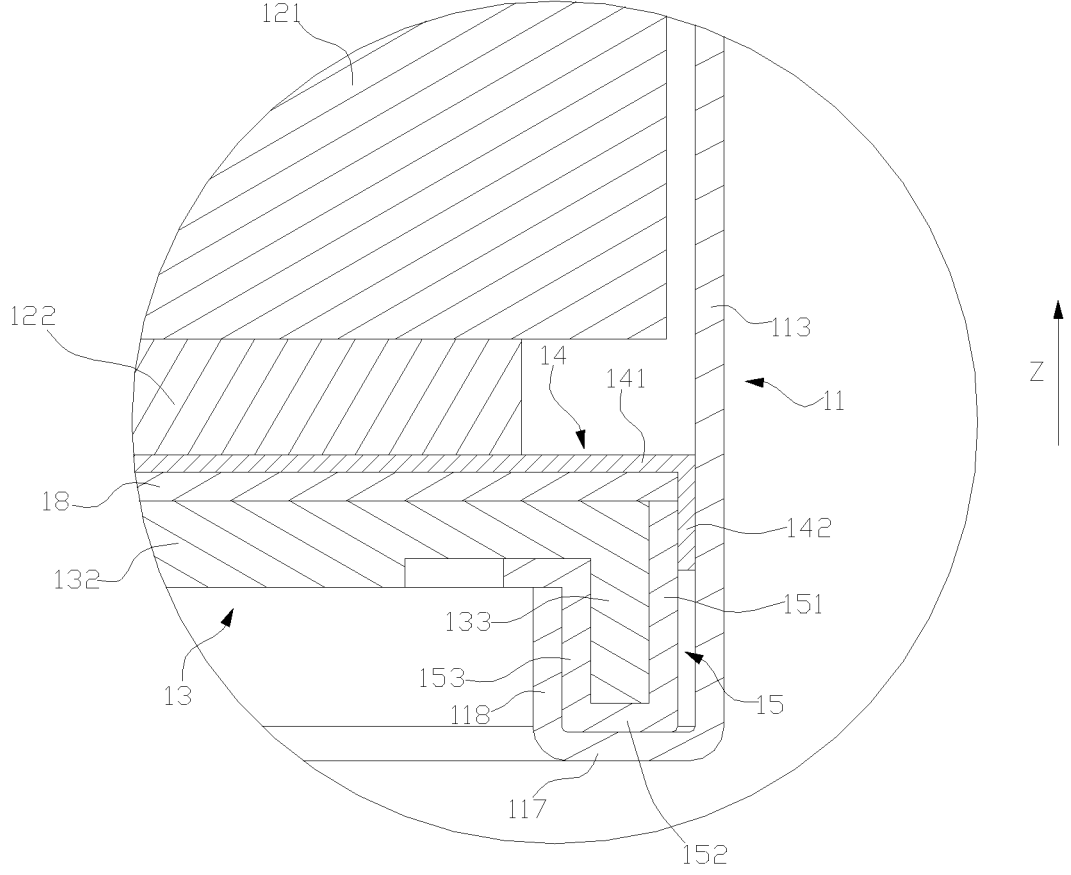
FIG. 6 is a partially enlarged view of a battery cell according to other some embodiments of this application.

In some embodiments, please refer to FIG. 6, FIG. 6 is a partially enlarged view of the battery cell 10 according to other some embodiments of this application. The sealing element 15 may further include a fourth connection portion 153, and the enclosing body 151, the third connection portion 152, and the fourth connection part 153 are sequentially connected. The end cover 13 includes a body portion 132 and an extension portion 133. The extension portion 133 extends from the body portion 132 in a direction departing from the electrode assembly 12, the enclosing body 151 is located outside the extension portion 133, and the fourth connection portion 153 is located inside the extension portion 133. In the thickness direction Z of the end cover 13, the third connection portion 152 is located between the extension portion 133 and the limiting portion 117. The limiting portion 117 is provided with a bending portion 118, the bending portion 118 is bent relative to the limiting portion 117 in a direction close to the electrode assembly 12, and the fourth connection portion 153 is located between the extension portion 133 and the bending portion 118. The limiting portion 117 presses the third connection portion 152 against the extension portion 133, and the bending portion 118 presses the fourth connection portion 153 against the extension portion 133. This structure may further improve the sealing performance between the end cover 13 and the housing 11.

For example, all of the third connection portion 152, the limiting portion 117, and the fourth connection portion 153 are in the annular structure.

In this embodiment, the housing 11 may be or may not be provided with a stepped face 116. For example, in FIG. 6, the housing 11 is not provided with the stepped face 116.

It should be noted that in the embodiments of this application, the sealing element 15 is not limited to the foregoing structure, and the sealing element 15 may also be in other structures. For example, the sealing element 15 only includes the enclosing body 151, and the enclosing body 151 is in a structure with two ends open. The enclosing body 151 is wrapped around an outer periphery of the end cover 13, and the enclosing body 151 abuts against the outer side surface 131 of the end cover 13 and the inner side surface 115 of the housing 11, or the enclosing body 151 abuts against the outer side surface 131 of the end cover 13 and the second connection portion 142 of the current collecting member 14, so as to achieve sealing between the housing 11 and the end cover 13. For another example, the sealing element 15 only includes the third connection portion 152, and in the thickness direction Z of the end cover 13, the third connection portion 152 is located between the limiting portion 117 and the end cover 13, so as to realize sealing between the housing 11 and the end cover 13.

Figure 7:
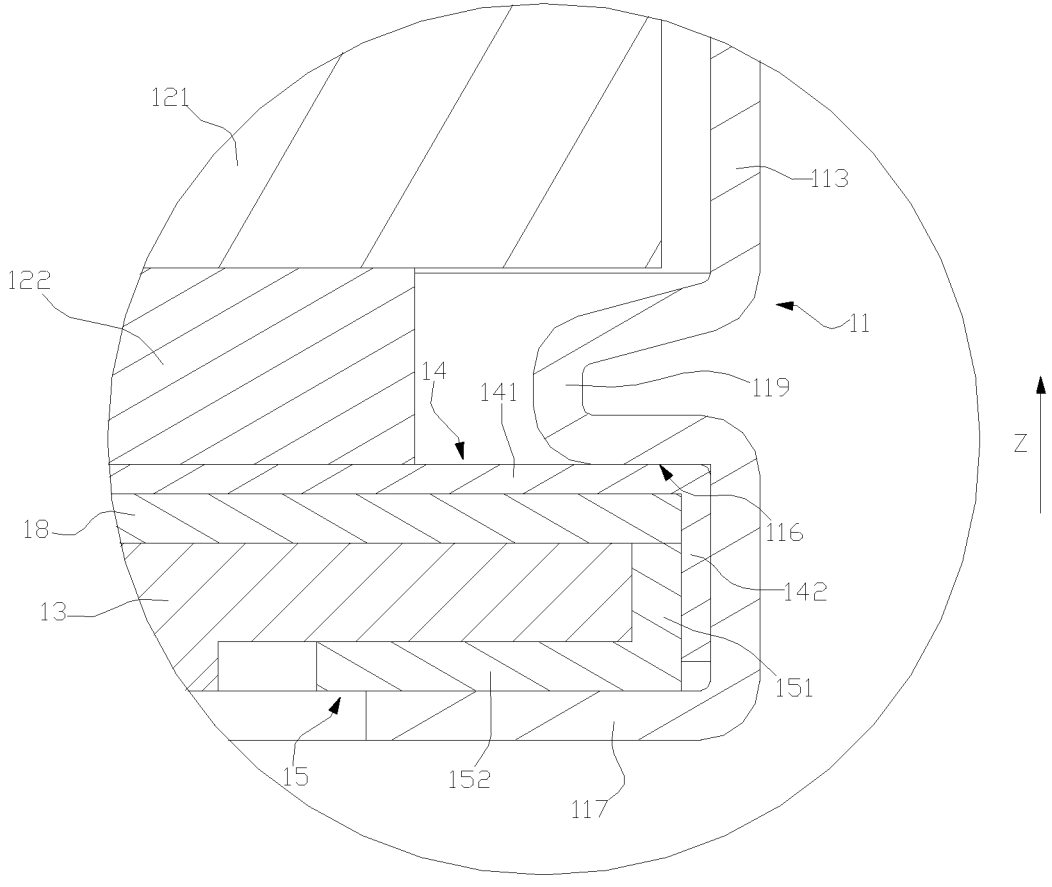
FIG. 7 is a partially enlarged view of a battery cell according to still other some embodiments of this application.

It should be noted that, in the embodiments of this application, the stepped face 116 of the housing 11 may be formed in various manners. For example, as shown in FIG. 5, a part of the housing 11 close to the opening 111 protrudes laterally, so that an inner diameter of a protruding part of the housing 11 is larger than an inner diameter of a part of the housing 11 that is not protruding, thereby forming the stepped face 116; for another example, please refer to FIG. 7, FIG. 7 is a partially enlarged view of the battery cell 10 according to still other some embodiments of this application. The housing 11 is partially recessed to form a second limiting protrusion 119, and the housing 11 is formed with a necking structure at a position of the second limiting protrusion 119. The second limiting protrusion 119 is configured to restrict the main body 121 of the electrode assembly 12 from moving in the direction close to the end cover 13, and a side of the second limiting protrusion 119 departing from the electrode assembly 12 is formed with the stepped face 116. For example, the second limiting protrusion 119 is in the annular structure.

Figure 8:
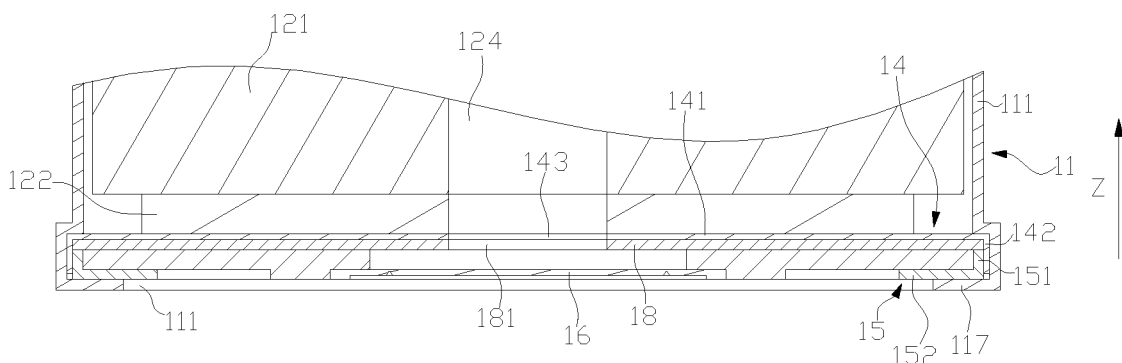
FIG. 8 is a partially view of a battery cell shown in FIG. 4.

In some embodiments, please refer to FIG. 8, FIG. 8 is a partially view of the battery cell 10 shown in FIG. 4. The battery cell 10 may further include an insulating element 18, and in the thickness direction Z of the end cover 13, the insulating element 18 is located between the first tab 122 and the end cover 13, and a projection of the insulating element 18 along the thickness direction Z of the end cover 13 covers the first tab 122. The insulating element 18 serves to isolate the end cover 13 from the first tab 122, which reduces a conductive risk of the end cover 13.

The projection of the insulating element 18 along the thickness direction Z of the end cover 13 covers the first tab 122, that is, the projection of the insulating element 18 along the thickness direction Z of the end cover 13 covers an end surface of the first tab 122 away from the main body 121 (an end surface through which the first tab 122 is connected to the current collecting member 14). For example, the first tab 122 is in the cylindrical structure, and the projection of the insulating element 18 along the thickness direction Z of the end cover 13 covers an annular end surface of the first tab 122 distal from the main body 121.

The insulating element 18 may be made of rubber, plastic, or other materials.

In some embodiments, in the thickness direction Z of the end cover 13, the insulating element 18 is at least partially located between the current collecting member 14 and the end cover 13 to insulate and isolate the current collecting member 14 from the end cover 13.

For example, in the thickness direction Z of the end cover 13, the insulating element 18 is partially located between the first connection portion 141 of the current collecting member 14 and the end cover 13 to insulate and isolate the current collecting member 14 from the end cover 13. The insulating element 18 is provided with a first through hole 181, and the first connection portion 141 is provided with a second through hole 143. Both the first through hole 181 and the second through hole 143 lead to a central hole 124 of the main body 121 of the electrode assembly 12. Both the first through hole 181 and the second through hole 143 are arranged opposite to the pressure relief mechanism 16, so that when an internal pressure or temperature of the battery cell 10 reaches a threshold, the pressure inside the battery cell 10 may be released through the pressure relief mechanism 16.

Figure 9:
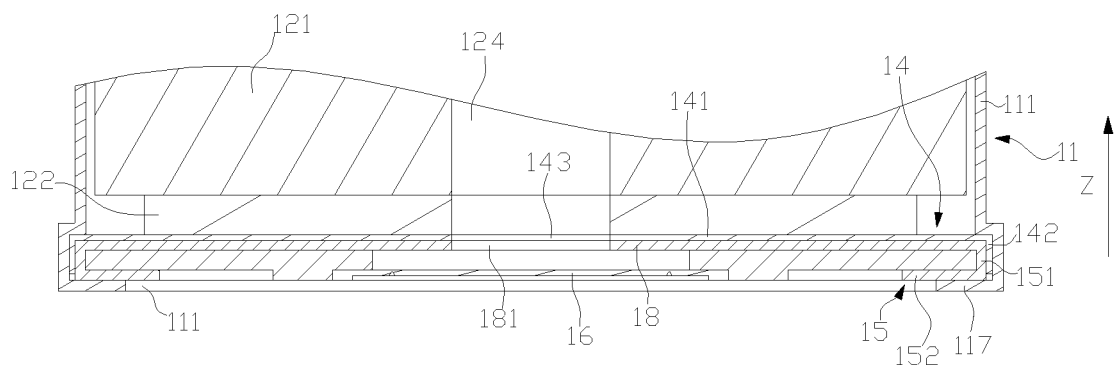
FIG. 9 is a partially view of a battery cell according to other embodiments of this application.

As shown in FIG. 8, the insulating element 18 and the sealing element 15 may be independent of each other, that is, the insulating element 18 and the sealing element 15 are two separate components. In other embodiments, please refer to FIG. 9, FIG. 9 is a partially view of the battery cell 10 according to other embodiments of this application. The insulating element 18 and the sealing element 15 may also be in an integrally formed structure, that is, the insulating element 18 and the sealing element 15 are integrally formed. For example, in the thickness direction Z of the end cover 13, the insulating element 18 and the third connection portion 152 are respectively located at two ends of the enclosing body 151, and the insulating element 18 and the third connection portion 152 jointly restrict the end cover 13 from separating from the sealing element 15.

Figure 10:
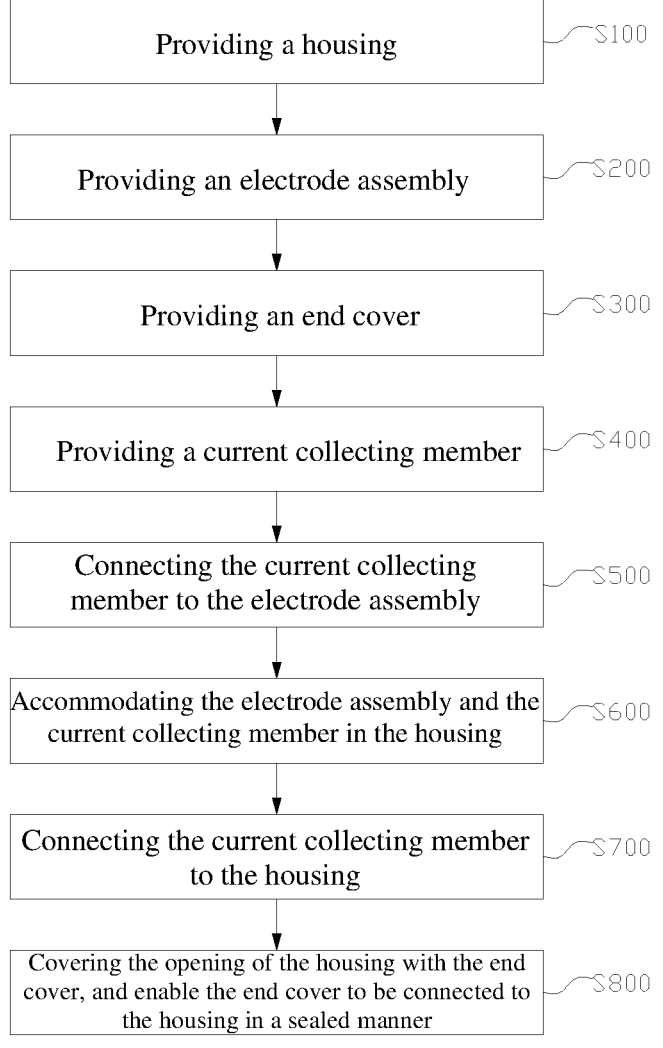
FIG. 10 is a flowchart of a battery cell manufacturing method according to some embodiments of this application.

The embodiments of this application provide a battery cell 10 manufacturing method. Please refer to FIG. 10, FIG. 10 is a flowchart of a battery cell 10 manufacturing method according to some embodiments of this application. The manufacturing method includes:

S100: Providing a housing 11 with an opening 111.

S200: Providing an electrode assembly 12.

S300: Providing an end cover 13.

S400: Providing a current collecting member 14.

S500: Connecting the current collecting member 14 to the electrode assembly 12.

S600: Accommodating the electrode assembly 12 and the current collecting member 14 in the housing 11.

S700: Connecting the current collecting member 14 to the housing 11, so that the electrode assembly 12 is electrically connected to the housing 11.

S800: Covering the opening 111 of the housing 11 with the end cover 13, and enable the end cover 13 to be connected to the housing 11 in a sealed manner, so that the current collecting member 14 is located on a side of the electrode assembly 12 facing the end cover 13.

In the foregoing method, a sequence of step S100, step S200, step S300, and step S400 is not limited. For example, step S400 may be performed first, and then step S300, step S200, and step S100 are performed in sequence.

In some embodiments, step S700 may include: welding the current collecting member 14 to the housing 11 from the inside of the housing 11, where the melting point of the current collecting member 14 is lower than the melting point of the housing 11.

Since the melting point of the current collecting member 14 is lower than the melting point of the housing 11, when the current collecting member 14 is welded to the housing 11 from the inside of the housing 11, the housing 11 is not prone to be broken down, which effectively reduces the liquid leakage risk of the housing 11.

In some embodiments, please refer to FIG. 11, FIG. 11 is a flowchart of a battery cell 10 manufacturing method according to some other embodiments of this application. After the end cover 13 covers the opening 111, the manufacturing method may further include:

S900: Flanging the housing 11, so that the housing 11 forms a limiting portion 117 at an end with the opening 111, so that the limiting portion 117 restricts the end cover 13 from separating from the housing 11 along a direction departing from the electrode assembly 12.

The limiting portion 117 is formed by flanging to restrict the end cover 13 from separating from the housing 11 along a direction departing from the electrode assembly 12, which is simple to realize and may effectively reduce manufacturing costs.

It should be noted that, for relevant structures of the battery cell 10 manufactured through the manufacturing method provided in the foregoing embodiments, please refer to the battery cell 10 provided in the foregoing embodiments, and details are not described herein again.

Figure 12:
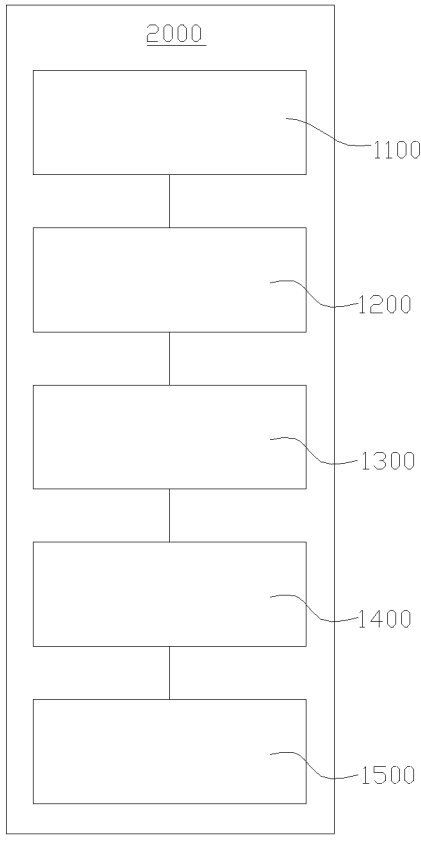
FIG. 12 is a schematic block view of a battery cell manufacturing device according to some embodiments of this application.

In addition, the embodiments of this application further provide a battery cell 10 manufacturing device 2000. Please refer to FIG. 12, FIG. 12 is a schematic block view of the battery cell 10 manufacturing device 2000 according to some embodiments of this application. The manufacturing device 2000 includes a first providing apparatus 1100, a second providing apparatus 1200, a third providing apparatus 1300, a fourth providing apparatus 1400, and an assembling apparatus 1500.

The first providing apparatus 1100 is configured to provide a housing 11 with an opening 111. The second providing apparatus 1200 is configured to provide an electrode assembly 12. The third providing apparatus 1300 is configured to provide an end cover 13. The fourth providing apparatus 1400 is configured to provide a current collecting member 14. The assembling apparatus 1500 is configured to connect the current collecting member 14 to the electrode assembly 12; accommodate the electrode assembly 12 and the current collecting member 14 in the housing 11; connect the current collecting member 14 to the housing 11, so that the electrode assembly 12 is electrically connected to the housing 11; and cover the opening 111 with the end cover 13, and enable the end cover 13 to be connected to the housing 11 in a sealed manner, so that the current collecting member 14 is located on a side of the electrode assembly 12 facing the end cover 13.

It should be noted that, for relevant structures of the battery cell 10 manufactured through the manufacturing device 2000 provided in the foregoing embodiments, please refer to the battery cell 10 provided in the foregoing embodiments, and details are not described herein again.

It should be noted that the embodiments in this application and features in the embodiments may be combined with each other if there is no conflict.

The foregoing embodiments are only used to illustrate the technical solutions of this application, and are not used to limit this application. For a person skilled in the art, this application may have various modifications and changes. Any modification, equivalent replacement and improvement made within the spirit and principle of this application shall be included in the protection scope of this application.

What is claimed is:

1. A battery cell, comprising:

a housing with an opening;

an electrode assembly accommodated in the housing;

an end cover covering the opening and being connected to the housing in a sealed manner; and a current collecting member accommodated in the housing and being located on a side of the electrode assembly facing the end cover, wherein the current collecting member is configured to be connected to the housing and the electrode assembly, so that the electrode assembly is electrically connected to the housing;

wherein the electrode assembly comprises a first tab, and the first tab is configured to be connected to the current collecting member, the first tab is monolithic;

the battery cell further comprises an insulating element, in a thickness direction of the end cover, the insulating element is located between the first tab and the end cover;

wherein the current collecting member comprises a first connection portion and a second connection portion, in the thickness direction of the end cover, at least a part of the first connection portion is located between the end cover and the electrode assembly, and the first connection portion is configured to be connected to the electrode assembly, a portion of the insulating element is located between the first connection portion and the end cover, and the portion of the insulating element contacts both the first connection portion and the end cover;

the second connection portion is connected to the first connection portion and extends, departing from the electrode assembly, from the first connection portion along the thickness direction of the end cover, the entire first connection portion is perpendicular to the second connection portion; and the second connection portion is configured to be connected to the housing;

wherein the first tab comprises a first surface, the first surface being a surface of the first tab away from the electrode assembly, and the entire first surface is physically connected to the insulating element via the first connection portion;

wherein the end cover comprises a body portion and an extension portion, and the extension portion extends from the body portion in a direction departing from the electrode assembly.

2. The battery cell according to claim 1, wherein the current collecting member is connected to an inner side surface of the housing.

3. The battery cell according to claim 2, wherein an outer side surface of the end cover is arranged opposite to the inner side surface of the housing; and at least a part of the current collecting member is located between the outer side surface of the end cover and the inner side surface of the housing, and the end cover is configured to abut a part of the current collecting member against the inner side surface of the housing.

4. The battery cell according to claim 1, wherein the second connection portion is an annular structure connected to an outer edge of the first connection portion.

5. The battery cell according to claim 1, wherein the housing is provided with a limiting portion at one end of the opening; and the limiting portion is configured to restrict the end cover from separating from the housing along a direction departing from the electrode assembly.

6. The battery cell according to claim 5, wherein in the thickness direction of the end cover, at least a part of the end cover is located between the limiting portion and the current collecting member, and the limiting portion and the current collecting member jointly restrict the end cover from moving in the thickness direction of the end cover.

7. The battery cell according to claim 5, wherein an inner surface of the housing comprises a stepped face; and in the thickness direction of the end cover, at least a part of the end cover is located between the limiting portion and the stepped face, and the limiting portion and the stepped face jointly restrict the end cover from moving in the thickness direction of the end cover.

8. The battery cell according to claim 5, wherein the limiting portion is in an annular structure.

9. The battery cell according to claim 5, wherein the limiting portion is in a flanging structure in which the housing is partially folded inward.

10. The battery cell according to claim 1, wherein an inner surface of the housing comprises a stepped face; and the current collecting member abuts against the stepped face along a direction facing the electrode assembly.

11. The battery cell according to claim 1, wherein the battery cell further comprises a sealing element; and the end cover is connected to the housing in a sealed manner through the sealing element; and wherein the sealing element is configured to insulate and isolate the housing from the end cover.

12. The battery cell according to claim 11, wherein the sealing element is configured to wrap the end cover along a circumferential direction of the opening.

13. The battery cell according to claim 11, wherein the housing is provided with a limiting portion at one end of the opening, and in the thickness direction of the end cover, at least a part of the sealing element is located between the end cover and the limiting portion, so as to realize sealing connection between the end cover and the housing; and wherein the sealing element comprises an enclosing body and a third connection portion, and the third connection portion is connected to the enclosing body; and at least a part of the end cover is located in the enclosing body, and in the thickness direction of the end cover, the third connection portion is located between the end cover and the limiting portion, so as to realize sealing connection between the end cover and the housing.

14. The battery cell according to claim 1, wherein the electrode assembly comprises a main body, the first tab is in a cylindrical structure, one end of the first tab is connected to the main body, and the other end of the first tab is welded to the current collecting member.

15. The battery cell according to claim 1, wherein the current collecting member is welded to the housing; and wherein a melting point of the current collecting member is lower than a melting point of the housing.

16. A battery cell manufacturing method, comprising:

providing a housing with an opening;

providing an electrode assembly;

providing an end cover;

providing a current collecting member;

connecting the current collecting member to the electrode assembly;

accommodating the electrode assembly and the current collecting member in the housing;

connecting the current collecting member to the housing, so that the electrode assembly is electrically connected to the housing;

covering the opening with the end cover, and enabling the end cover to be connected to the housing in a sealed manner, so that the current collecting member is located on a side of the electrode assembly facing the end cover; and wherein the connecting the current collecting member to the housing comprises:

welding the current collecting member to the housing from an inside of the housing, wherein a melting point of the current collecting member is lower than a melting point of the housing; and wherein the manufacturing method further comprises:

after covering the opening with the end cover, flanging the housing, so that the housing forms a limiting portion at an end with the opening, so that the limiting portion restricts the end cover from separating from the housing along a direction departing from the electrode assembly;

wherein the electrode assembly comprises a first tab, and the first tab is configured to be connected to the current collecting member, the first tab is monolithic;

the battery cell further comprises an insulating element, in a thickness direction of the end cover, the insulating element is located between the first tab and the end cover; wherein the current collecting member comprises a first connection portion and a second connection portion, in the thickness direction of the end cover, at least a part of the first connection portion is located between the end cover and the electrode assembly, and the first connection portion is configured to be connected to the electrode assembly, a portion of the insulating element is located between the first connection portion and the end cover, and the portion of the insulating element contacts both the first connection portion and the end cover;

the second connection portion is connected to the first connection portion and extends, departing from the electrode assembly, from the first connection portion along the thickness direction of the end cover, the entire first connection portion is perpendicular to the second connection portion, and the second connection portion is configured to be connected to the housing;

wherein the first tab comprises a first surface, the first surface being a surface of the first tab away from the electrode assembly, and the entire first surface is physically connected to the insulating element via the first connection portion;

wherein the end cover comprises a body portion and an extension portion, and the extension portion extends from the body portion in a direction departing from the electrode assembly.

17. A battery cell manufacturing device, comprising:

a first providing apparatus configured to provide a housing with an opening;

a second providing apparatus configured to provide an electrode assembly;

a third providing apparatus configured to provide an end cover;

a fourth providing apparatus configured to provide a current collecting member; and an assembling apparatus configured to connect the current collecting member to the electrode assembly; accommodate the electrode assembly and the current collecting member in the housing; connect the current collecting member to the housing, so that the electrode assembly is electrically connected to the housing; and cover the opening with the end cover, and enable the end cover to be connected to the housing in a sealed manner, so that the current collecting member is located on a side of the electrode assembly facing the end cover;

wherein the electrode assembly comprises a first tab, and the first tab is configured to be connected to the current collecting member, the first tab is monolithic;

the battery cell further comprises an insulating element, in a thickness direction of the end cover, the insulating element is located between the first tab and the end cover; wherein the current collecting member comprises a first connection portion and a second connection portion, in the thickness direction of the end cover, at least a part of the first connection portion is located between the end cover and the electrode assembly, and the first connection portion is configured to be connected to the electrode assembly, a portion of the insulating element is located between the first connection portion and the end cover, and the portion of the insulating element contacts both the first connection portion and the end cover;

the second connection portion is connected to the first connection portion and extends, departing from the electrode assembly, from the first connection portion along the thickness direction of the end cover, the entire first connection portion is perpendicular to the second connection portion, and the second connection portion is configured to be connected to the housing;

wherein the first tab comprises a first surface, the first surface being a surface of the first tab away from the electrode assembly, and the entire first surface is physically connected to the insulating element via the first connection portion;

wherein the end cover comprises a body portion and an extension portion, and the extension portion extends from the body portion in a direction departing from the electrode assembly.

18. The battery cell according to claim 1, wherein an inner side surface of the housing is approximately parallel to the second connection portion, and the second connection portion is welded to the inner side surface of the housing;

wherein an inner surface of the housing comprises a stepped face connected to the inner side surface, and the first connection portion abuts against the stepped face in a direction facing the electrode assembly.

19. The battery cell according to claim 1, wherein the battery cell further comprises a sealing element, the end cover is connected to the housing through the sealing element;

the sealing element comprises an enclosing body, a third connection portion and a fourth connection portion, the enclosing body, the third connection portion, and the fourth connection part are sequentially connected, the enclosing body is located outside the extension portion, and the fourth connection portion is located inside the extension portion, in the thickness direction, the third connection portion is located on a side of the extension portion facing away from the electrode assembly.

* * * * *